US 12,406,279 B2

(12) United States Patent
Rajaram et al.

(10) Patent No.: US 12,406,279 B2
(45) Date of Patent: Sep. 2, 2025

(54) ASSURED PROTOCOL ONLINE REVIEW VALIDATION SYSTEM

(71) Applicant: BeAssured Co., Little Rock, AR (US)

(72) Inventors: Santoash Rajaram, Portland, OR (US);
Karan Mishra, Glenview, IL (US);
Thomas Davenport, Little Rock, AR (US)

(73) Assignee: BeAssured Co., Little Rock, AR (US)

( * ) Notice: Subject to any disclaimer, the term of this patent is extended or adjusted under 35 U.S.C. 154(b) by 0 days.

(21) Appl. No.: 18/104,594

(22) Filed: Feb. 1, 2023

(65) Prior Publication Data
US 2024/0257173 A1 Aug. 1, 2024

(51) Int. Cl.
*G06Q 30/02* (2023.01)
*G06N 5/022* (2023.01)
*G06Q 30/0217* (2023.01)
*G06Q 30/0282* (2023.01)

(52) U.S. Cl.
CPC ......... *G06Q 30/0218* (2013.01); *G06N 5/022* (2013.01); *G06Q 30/0282* (2013.01)

(58) Field of Classification Search
CPC .................................................. G06N 5/022
See application file for complete search history.

(56) References Cited

U.S. PATENT DOCUMENTS

| | | | |
|---|---|---|---|
| 8,032,827 B2 | 10/2011 | Melander et al. | |
| 9,723,059 B2 | 8/2017 | Lorphelin | |
| 10,089,660 B2 * | 10/2018 | Luan | G06Q 30/0282 |
| 10,831,924 B2 | 11/2020 | Miller | |
| 10,855,794 B2 | 12/2020 | Walsh et al. | |
| 11,218,324 B2 | 1/2022 | Wentz et al. | |

(Continued)

FOREIGN PATENT DOCUMENTS

| | | | | |
|---|---|---|---|---|
| KR | 102273932 | * | 7/2021 | ......... G06Q 30/0278 |

OTHER PUBLICATIONS

KR 102273932 B1 (Year: 2021).*

(Continued)

*Primary Examiner* — Vincent M Cao
(74) *Attorney, Agent, or Firm* — Michael P. Dunnam; CM Law PLLC

(57) ABSTRACT

The integrity of data (e.g., review data) provided via a computer network (e.g., the Internet) and relied upon by online consumers when making purchase decisions is assured using a blockchain protocol that conducts a machine learning enabled validation flow on a public blockchain with reward mechanisms designed to weed out fake and incentivized reviews. A machine learning (ML) annotator evaluates a review and provides a score that is passed to human validators along with annotations for validation. The human validators stake tokens against the annotated reviews in a proof-of-stake consensus model that provides financial incentives to the human validators to provide an increased number of trustworthy reviews. The review protocol is implemented via smart contracts that are stored and replicated on a blockchain network and that are used to facilitate, verify, and enforce the negotiation or performance of the terms of an agreement between the participants and the review protocol.

36 Claims, 8 Drawing Sheets

(56) References Cited

U.S. PATENT DOCUMENTS

| | | | |
|---|---|---|---|
| 2009/0228340 A1* | 9/2009 | Bohannon | G06Q 30/0217 |
| | | | 709/204 |
| 2016/0042413 A1* | 2/2016 | Flood | G06Q 50/01 |
| | | | 705/319 |
| 2017/0352041 A1 | 12/2017 | Ramamurthy et al. | |
| 2019/0087395 A1 | 3/2019 | Priestas et al. | |
| 2020/0250176 A1 | 8/2020 | Padmanabhan | |
| 2020/0394183 A1 | 12/2020 | Jois | |
| 2021/0112101 A1 | 4/2021 | Crabtree et al. | |
| 2021/0182423 A1 | 6/2021 | Padmanabhan | |
| 2021/0209661 A1* | 7/2021 | Esram | G06Q 30/0282 |
| 2021/0342742 A1 | 11/2021 | G et al. | |
| 2021/0357859 A1 | 11/2021 | Malvankar et al. | |
| 2023/0230408 A1* | 7/2023 | Arroyo | G06V 10/82 |
| | | | 382/156 |

OTHER PUBLICATIONS

Martens et al. 2018. ReviewChain: untampered product reviews on the blockchain. In Proceedings of the 1st International Workshop on Emerging Trends in Software Engineering for Blockchain (WETSEB '18). Association for Computing Machinery, New York, NY, USA, 40-43. https://doi.org/10.1 (Year: 2018).*

Harrison, Samuel, "Harmony Announces Validator DAO", Harmony Foundation, May 7, 2021.

Seier, Jonathan, "MonkeDAO Becomes the First DAO to Operate a Validator Node on the Solana Blockchain", Metaverse News, printed on Mar. 14, 2022.

* cited by examiner

ASSURED PROTOCOL ONLINE REVIEW VALIDATION SYSTEM

TECHNICAL FIELD

This disclosure describes a blockchain protocol for improving the quality of online reviews using a machine learning enabled validation flow that is conducted on a public blockchain with reward mechanisms designed to weed out fake and incentivized reviews.

BACKGROUND

Online reviews influence an estimated $5.5 trillion annual global e-commerce spend. Although 93% of customers read reviews before making a purchase, an average of 4% of reviews on major ecommerce sites are fake and those fake reviews have a direct impact on global online spending of $152 billion. Only 5-10% of customers leave a written review, causing aggregate ratings to be unreliable, and reviews are often not well written or helpful. Since there is no incentive to leave a review or to ensure a written review is useful and high quality, consumers are presented a mix of fake, low, and high quality reviews when evaluating a product or service. Since the first 10 reviews impact a purchasing decision, consumers either give up quickly or can feel cheated if the product is oversold with an unreliable aggregate rating or fake reviews.

E-commerce online review platforms have incorporated data-driven tools to make it relatively easy for customers to provide feedback relating to their online purchases. For example, the data-driven tools are used to generate review prompts likely to lead to customer engagement, targeted feedback with customers, display best reviews at appropriate portions in the online shopping experience, enabling e-commerce shoppers to customize their experiences by sorting and browsing reviews. Artificial intelligence has also been used to detect fake reviews and scams by identifying fake reviews, fake accounts, bots, and other types of fraud. Such systems enable a user to select a review that is analyzed to determine if it is generated from a fake account or bot or has otherwise been recognized as being generated by an unreliable or fraudulent source. However, such online review platforms do not provide technology solutions that incentivize the creation of better quality reviews or provide an analysis of the quality of the online reviews and maintain the integrity of such data for consumer reliance. As a result, existing online review systems typically provide an insufficient number of high quality, validated reviews. More generally, technology solutions are needed to weed out fake and incentivized information to thereby assure the integrity of data provided on the Internet that is relied upon by consumers when making purchase decisions.

SUMMARY

Various examples are now described to introduce a selection of concepts in a simplified form that are further described below in the Detailed Description. This Summary is not intended to identify key or essential features of the claimed subject matter, nor is it intended to be used to limit the scope of the claimed subject matter.

In sample configurations, a system is described that assures the validity of online product reviews of a product for online purchase. The system includes a blockchain that stores data relating to online product reviews, at least one smart contract that executes transactions on the blockchain, a machine learning (ML) annotator that annotates a product review from a product reviewer to generate an ML annotated review and provides a first score representative of a validity of the product review, a workflow application that enables users to access ML annotated reviews and data associated with the ML annotated reviews, to submit product reviews for a product, and to fetch data and execute transactions on the blockchain, wherein the workflow application provides the ML annotated review to a plurality of human validators for validation, and wherein the plurality of human validators each provide a second score representative of the validity of the product review, and an assured scoring engine that, once a predetermined number of second scores have been collected from the human validators, categorizes each product review as valid or invalid based on a final score that is a predetermined function of the first score and the second scores. The at least one smart contract specifies a number of tokens to be rewarded to a product reviewer and human validators for providing a valid product review and rewards tokens to the product reviewer and at least one of the human validators for providing the product review based on the number of tokens to be rewarded for the valid product review, a number of tokens staked against the product review in a proof-of-stake consensus model by the at least one of the human validators, and an accuracy of the product review. Also, the workflow application provides to at least one of the product reviewer or an owner of a product to which the product review is directed an indication of whether the product review is valid or invalid.

In the sample configurations, the at least one smart contract performs at least one of the functions of: assuring that only qualified product reviewers review the product to provide a product review; allowing a product reviewer to get paid based on a quality of the product review provided by the product reviewer; using a ML model to match human validators to the product based on knowledge of the human validators in a product category to which the product belongs; keeping track of skill sets of product reviewers and human validators in each product category; keeping track of micro-categories under each product category; using machine learning to identify at least one of incentivized product reviews or fake product reviews and providing the at least one of incentivized product reviews or fake product reviews to the plurality of human validators; or normalizing the product review based on a skill profile of the product reviewer.

In the sample configurations, the ML annotator automatically annotates the product review with at least one of the following: a readability score; simple or complex vocabulary; grammatical usage and mistakes; use of repeated explanation marks; overuse of emojis; an indication of whether text of the product review is in line with other product reviews created by the product reviewer; an ideal length of the product review; whether the product review is suspected to be fake; whether videos or photos are included with the product review; verification that a purchase has been made; whether a competitor's product is referenced favorably compared to the product in the product review; whether an artificial intelligence model created the product review; whether the product review is spam; whether extracted product features are mentioned in the product review; whether the product review is overly negative or positive; a number of product reviews from a same userID in the last predetermined number of hours; an IP Address of the product reviewer; or a skill score of the product reviewer.

In the sample configurations, the workflow application distributes the ML annotated review to human validators who are members of a product category to which the product review belongs in a round robin fashion. The workflow application may distribute the ML annotated review to all human validators who are members of the product category in a queue-like fashion in an order based on an amount of tokens at stake by each human validator or to a first x number of validators in a queue. When a human validator does not respond to more than n number of invitations, the human validator may be removed from the queue for a predetermined period of time.

In the sample configurations, a validator decentralized autonomous organization (DAO) data structure may be provided that clusters the product categories hierarchically. The at least one smart contract may receive tokens to fund the online product reviews from subscription fees and set up the validator DAO data structure and policies associated with the validator DAO data structure establishing the product categories.

In the sample configurations, the predetermined function of the first score and the second scores may be provided by an owner of the product to which the product review is directed to specify an extent to which the product review is to be based on ML validation versus human validation. The predetermined number of second scores collected from the human validators may be a function of skill scores of the human validators that provide the second scores.

In the sample configurations, a skill scoring engine may be provided to update a skill score of at least one of the human validators based on a comparison of the at least one human validator's second score to the final score. The skill scoring engine may calculate the skill score of the at least one of the human validators based on at least one of: an amount of tokens that the at least one of the human validators has staked against a given product category; a number of validated reviews authored in the given product category or a related product category by the at least one of the human validators; a number of successful validations performed in the given product category or the related product category by the at least one of the human validators; completeness of each validation performed by the at least one of the human validators; a percentile of time taken by the at least one of the human validators to complete a validation; a completeness of the product review; a usefulness rating of the product reviews participated in by the at least one of the human validators; or confirmed purchases based on a product review validated by the at least one of the human validators. A regression model also may be used to generate a skill score between 0-1 against a given product category indicating the skill score of the at least one of the human validators. For example, a skill score of 1 may indicate that the at least one of the human validators is at an expert level in the given product category, and a skill score of 0 may indicate that the at least one of the human validators has no previous experience in the given product category.

In the sample configurations, the at least one smart contract may include a reward smart contract that rewards tokens to the product reviewer and at least one of the human validators for providing the product review by enabling the at least one of the human validators to stake tokens for themselves to be a member of a specific product category, by delegating tokens to another human validator to be a member of the specific product category, or by delegating tokens to another human validator without any restriction to a product category. The at least one smart contract may further include a staking smart contract that creates a staking pool for the product review and rewards tokens to the product reviewer and the at least one of the human validators from the staking pool based on stakes of the product reviewer and the at least one of the human validators in the staking pool. The staking smart contract may further enable a delegator to stake tokens to a human validator in the staking pool for a specific product category and to split any tokens rewarded to the human validator as a result of validation services performed by the human validator. The tokens may be taken from the staking pool and split proportionally amongst the human validator and the delegator based on respective stakes in the staking pool. The staking smart contract also may use a validator's staked tokens and the validator's skill score to prioritize the validator in a specific review category for receipt of product reviews for validation.

In the sample configurations, the at least one smart contract may further include a review state machine contract that maintains all state machines associated with a product review and maintains all data stored on the blockchain relating to the product review.

In the sample configurations, a product configurator may also be provided that maintains a database of all products that are available for review along with metadata about the product, the metadata including at least one of a product category of the product, review questions to ask, or a minimum number of human validators required.

A method of assuring the validity of online product reviews of a product for online purchase and a computer readable medium including instructions that when executed by a processor causes the processor to perform operations to implement the method are also described. The method includes:

providing at least one smart contract that specifies a number of tokens to be rewarded to a product reviewer and a human validator for providing a valid product review;

annotating a product review from a product reviewer to generate a machine learning (ML) annotated review and providing a first score representative of a validity of the product review;

providing the ML annotated review to a plurality of human validators for validation, wherein the plurality of human validators each provide a second score representative of the validity of the product review;

once a predetermined number of second scores have been collected from the human validators, categorizing each product review as valid or invalid based on a final score that is a predetermined function of the first score and the second scores;

rewarding tokens to the product reviewer and at least one of the human validators for providing the product review based on the number of tokens to be rewarded for the valid product review by the at least one smart contract, a number of tokens staked against the product review in a proof-of-stake consensus model by the at least one of the human validators, and an accuracy of the product review; and providing to at least one of the product reviewer or an owner of a product to which the product review is directed an indication of whether the product review is valid or invalid.

The method may be performed by the apparatus, and further features of the method result from the functionality of the apparatus. Also, the explanations provided for each aspect and its implementation apply equally to the other aspects and the corresponding implementations. The different configurations may be implemented in hardware, software, or any combination thereof. Also, any one of the foregoing examples may be combined with any one or more of the other foregoing examples to create a new configuration within the scope of the present disclosure.

DETAILED DESCRIPTION OF THE DRAWINGS

The foregoing and other beneficial features and advantages of the subject matter described herein will become apparent from the following detailed description in connection with the attached figures, of which:

DETAILED DESCRIPTION OF ILLUSTRATIVE CONFIGURATIONS

Figure 1:
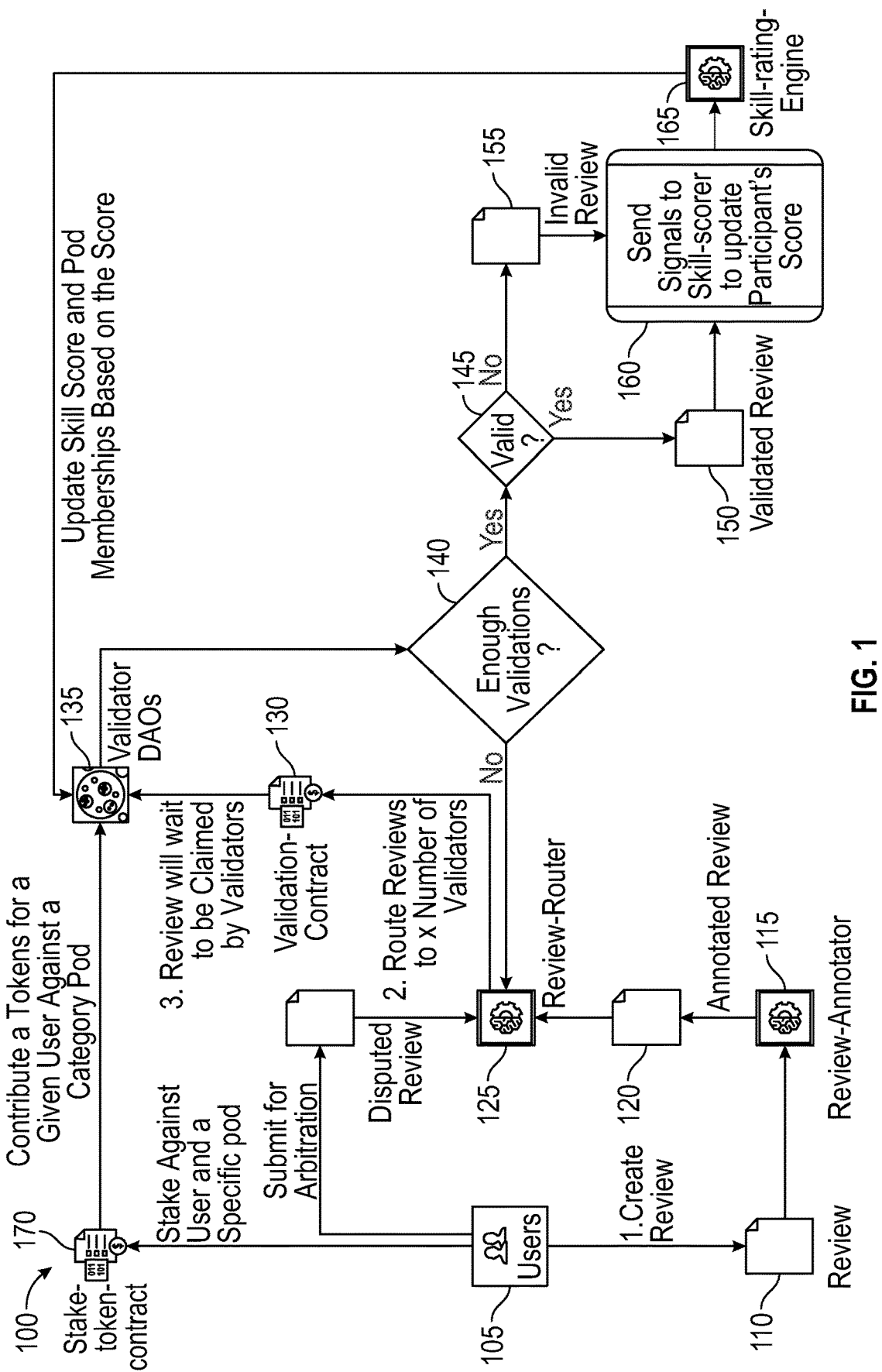
FIG. 1 illustrates a process flow of an assured protocol online review validation method in a sample configuration.

Sample configurations will be described with respect to FIGS. 1-8 for use in providing validation of online reviews (e.g., product reviews), although those skilled in the art will appreciate that the teachings provided herein may be used for other purposes such as validating the integrity of information provided online. Such configurations are intended to be within the scope of the present disclosure.

The system and methods described herein allow e-commerce and online review companies to solve the noted problems with online reviews by providing a consistent, decentralized validation process that incentivizes high quality written reviews. Machine learning (ML) models are combined with a decentralized validation protocol to provide a technology solution that virtually eliminates fake reviews and increases the amount of written reviews through incentivization. Through the ML model and validation protocol scoring, sites can display a significantly greater number of high quality, validated reviews to potential buyers. In addition, product recommendations can be enhanced through the use of validated, high quality ratings, instead of including products with mostly ratings without reviews, low quality reviews, or fake reviews.

In sample configurations, the system and methods validate individual reviews using a combination of artificial intelligence (AI) and human validators. The resulting review protocol uses proof-of-stake as the consensus model. The review protocol ensures that the system is fair and transparent to all the users involved (reviewers, validators, arbitrators, delegators, consumers, etc.) by establishing smart contracts that are open to everyone. As known to those skilled in the art, a smart contract is a self-executing contract with the terms of the agreement between the participants and the review protocol being directly written into lines of code. This code is stored and replicated on the blockchain network and can be used to facilitate, verify, and enforce the negotiation or performance of a contract. A smart contract is used to capture all interactions in the review protocol described herein. Each smart contract codifies an interaction.

For example, the review protocol described herein may be implemented as a collection of smart contracts that perform at least the following actions:

assure that only qualified reviewers participate in the review process using ML/AI techniques;

allow the reviewers to get paid based on the quality of the review;

use a ML model to match the validators to the products (i.e. validators should be knowledgeable in the micro-category that the product belongs to);

keep track of a reputation system that keeps track of individuals' skill sets in each of the micro-categories;

implement a consensus mechanism to keep track of micro-categories (e.g.: fantasy books, sci-fi books, gaming apps, etc.) under each domain (books, apps, etc.);

setup pods of arbitrators aligned with micro-categories to form a decentralized autonomous organization (DAO) to ensure that anyone in the ecosystem can appeal a review process to this organization;

use ML to identify incentivized reviews and fake reviews which then will be fed as signals to validators for confirming; and normalize the rating of a given product based on the profile of the reviewer.

The system and method described herein provides a technology solution that assures the integrity of data (e.g., review data) that is provided via a computer network (e.g., the Internet) and relied upon by online consumers when making purchase decisions via the computer network. Sample embodiments use a blockchain protocol to improve the quality of online reviews used in making online purchase decisions. The blockchain protocol uses a machine learning enabled validation flow that is conducted on a public blockchain with reward mechanisms designed to weed out fake and incentivized reviews. A machine learning (ML) annotator evaluates a review and provides a score that is passed to human validators along with annotations for validation. The human validators stake tokens against the annotated reviews in a proof-of-stake consensus model that provides incentives to the human validators to provide an increased number of trustworthy reviews. The review protocol is implemented via smart contracts that are stored and replicated on a blockchain network and that are used to facilitate, verify, and enforce the negotiation or performance of the terms of an agreement between the participants (e.g., reviewers and validators) and the review protocol. The review protocol enables a product owner to fund the review process and to provide different mechanisms like a survey to test a reviewer's knowledge, integrations with retailers, QR Code based validations to validate a user's qualifications to post a review, and the like. The product owner may also specify the extent to which the review is based on ML validation versus human validation.

The review protocol includes the ML annotator that annotates reviews and generates a ML review score. The annotated reviews are distributed to human validators who stake tokens against the review categories (pods) to which the reviews are assigned by the product owners. The annotated reviews are allocated to the human validators as a function of the human validators' stakes and skills in the review category. The reviews themselves may be based on different combinations of review questions and validation questions adapted to collect the requisite review information. Once enough reviews have been collected, the reviews are validated (e.g., as a function of the ML scoring and human validator scoring) and categorized as a valid or an invalid review based on the scoring results. The validators' skill scores are updated based on the accuracy of their scoring relative to the final scoring results. A staking contract captures the amount of tokens, the entity that the tokens are staked against, and the time since it has been staked. These details are stored on the blockchain and used at the end of the review chain to calculate rewards. The staking contract also rewards participants periodically from a staking pool based on their stake. Each review that is submitted is allocated some tokens ("bounty") to be paid out for fees and bonuses. The bounty amount is configured and governed by each category pod of the reviews. Reviewers and validators both earn a fee for participating in the review chain and providing accurate results. Arbitration is provided to resolve disputes. The combination of ML validation and human validation along with appropriate reward mechanisms weeds out fake and incentivized reviews and may be similarly used to more generally weed out fake and incentivized information provided in a computer network.

FIG. 1 illustrates a process flow of an assured protocol online review validation method 100 for implementing such a technology solution in a sample configuration.

As illustrated in FIG. 1, the assured protocol online review validation method 100 starts when a reviewer 105 submits a review 110. Each reviewer 105 submitting a review uses a crypto-wallet or an application that uses a wallet software development kit (SDK) to enable the application to interact with the software implementing the assured protocol online review validation method 100 (see FIG. 2). Each crypto-wallet or application is identified using a unique wallet address. This address is tracked via smart contract and stored on a blockchain. When the review 110 is submitted, a new transaction is created in the blockchain to record the review 110 submitted by the reviewer 105. The transaction identification (ID) associated with this submission may be stored offline along with a state machine (see FIGS. 4A and 4B).

Once the review 110 has been submitted, the review 110 is annotated using a machine learning (ML) model review annotator 115 so the review 110 can be categorized and summarized appropriately. As known to those skilled in the art, ML models trained on labeled review data to accurately predict the authenticity of the reviews provide a quick and efficient way for humans to understand the overall sentiment of the reviews. To ensure a human-centered approach, the ML model's performance of the review annotator 115 may be regularly reviewed and evaluated and any necessary adjustments made to improve its accuracy and relevance to the needs of human users. Clear explanations and justifications for the ML model's predictions may also be provided via an interface to the reviewer's crypto-wallet so that the reviewer 105 can easily understand and trust the annotations.

All annotated reviews 120 that are annotated by review annotator 115 are routed by review router 125 to a number of validators represented by validation contracts 130. The annotated reviews 120 end up in a categorized pool (validator decentralized autonomous organizations (DAOs)) 135 of annotated reviews 120 that are validated by the validators 130. Each review category will have a pool, so the annotated reviews 120 are generally pushed to the validators 130 who have staked the most amount of tokens against the categories. Each validator 130 will have a queue managed via the crypto-wallet application to claim and validate reviews 110. Validators 130 who staked the most amount of tokens against a category will have a higher chance of receiving more reviews 110. Validators 130 can either stake their tokens or stake tokens delegated to them by delegators.

Validators 130 "claim" annotated reviews 120 that are pushed into their queue via their wallet application. The annotated reviews 120 generally are pushed to more validators 130 than needed. The first predetermined number (x) of validators 130 to respond will end up performing the validation. The annotated reviews 120 in the other validators' queues will expire once an acknowledgment is received from the first x number of validators. Thus, the human-centered AI in this scenario prioritizes the needs and preferences of the human users, while leveraging the efficiency and accuracy of machine learning to enhance their decision-making process.

Once it is determined at 140 that the annotated review 120 has received enough validations by the validators 130, the annotated review 120, if determined to be valid at 145, goes into a validated review state 150. At this point, validators 130 may be provided with feedback on the ML model's performance with suggested improvements. Such feedback provides continuous improvement of the ML model and ensures that the ML model remains aligned with human needs and preferences. Conversely, if the annotated review 120 is determined to be invalid at 145, the annotated review 120 goes into an invalid review state 155. The actual data that is collected may be maintained in a database table, as described further below with respect to FIG. 2.

Once the annotated review 120 receives enough validations, the valid and invalid reviews are sent at 160 to a skill rating engine 165 to calculate a review score. Review scoring by the skilled rating engine 165 is branded as the assured score for the annotated review 120. Assured scores can be gathered or accumulated for a review, service, product, product line, or business. The skill/trust score is calculated for individual validators 130 based on a simple statistical model. For instance, the skill score for a given validator 130 can be calculated based on the how their rating varied from the mean rating for a given review. The more the validator's rating deviated from the average or mean, the lower the validator's score will be. The updated skill score and pod memberships for the validators based on the scores are fed back to update the validator DAOs 135.

To determine a pod membership for a review, a validator 130 stakes a given number of tokens against a user and a specific pod, which is represented by stake-token smart contract 170. The stake-token smart contract 170 contributes tokens for a specific user against a category pod. More details of the staking process will be provided below.

Figure 2:
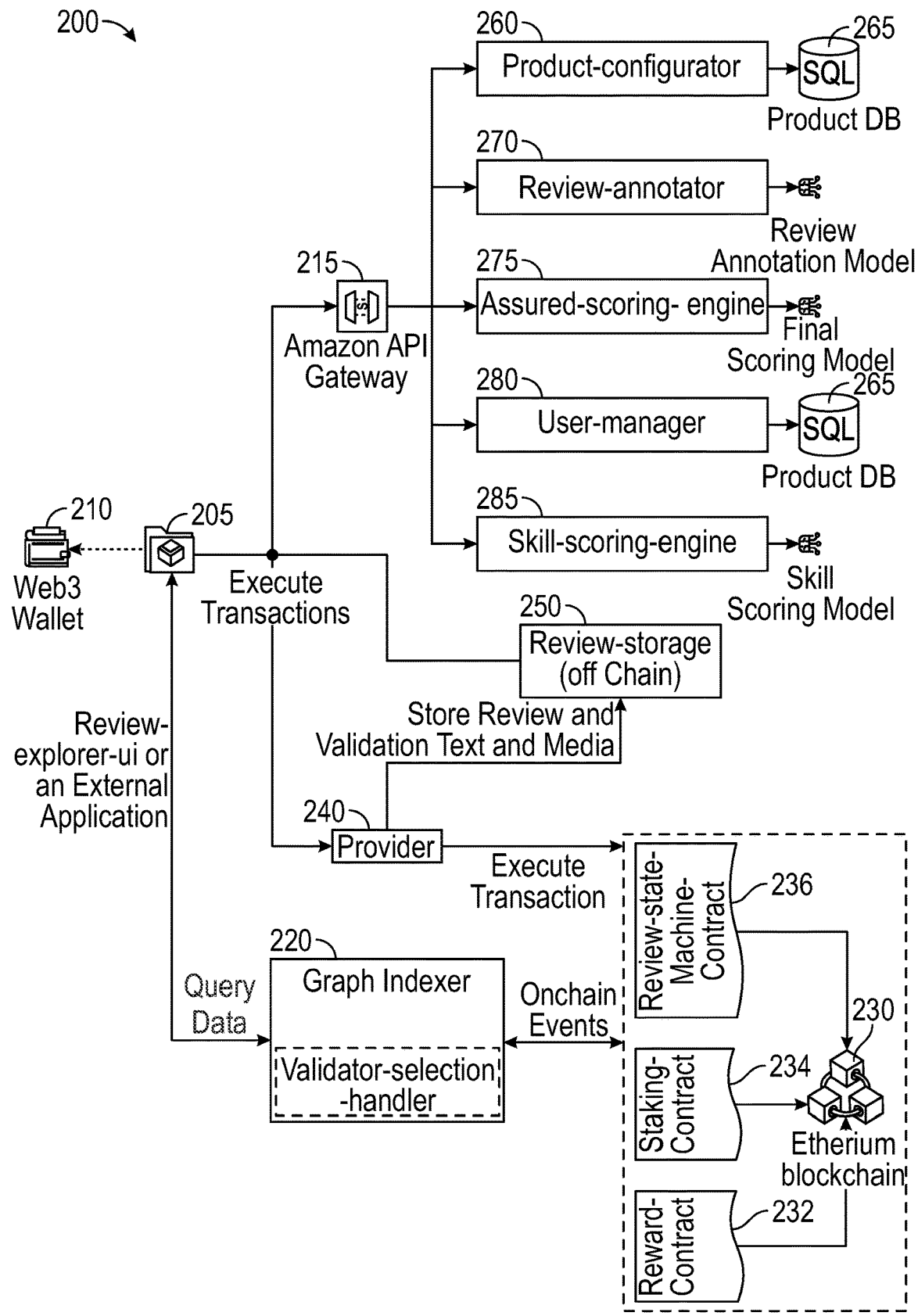
FIG. 2 illustrates the system components for implementing the method of FIG. 1 in a sample configuration.

FIG. 2 illustrates the system 200 for implementing the assured protocol online review validation method 100 of FIG. 1 in a sample configuration.

As illustrated in FIG. 2, the assured protocol online review validation system 200 includes a review explorer 205, which is a workflow application that allows participants in the assured protocol online review validation system 200 to transparently access all the annotated reviews 120 that are flowing through the assured protocol online review validation system 200 and the data associated with the annotated reviews 120. The review explorer 205 allows participants to easily filter the annotated reviews 120 by product, by reviewer, by validator, etc. The review explorer 205 user interface (UI) also allows users to submit reviews 110 for a specific product. In addition to the annotated reviews 120, the review explorer 205 UI also allows users to view other participants and their skill scores. Thus, the review explorer 205 UI offers transparency over all the details managed by the assured protocol online review validation system 200.

In sample configurations, review explorer 205 is a web application that integrates with a web3 wallet 210 (like Metamask) to sign all the transactions sent to the backend for processing. The review explorer 205 may use an application programming interface (API) gateway 215, such as an Amazon API Gateway, to fetch data that is stored off the blockchain 230 and may use a graph indexer 220 to fetch data from the blockchain 230. The review explorer 205 also may use Provider nodes 240 to execute transactions on the blockchain 230.

In sample configurations, the API gateway 215 acts as a common entry point for all the APIs and services that manage the data that is not stored on the blockchain 230. The API gateway 215 also manages the scaling and security needs of the API. The review explorer 205 uses this API gateway 215 to make a change to any of the backend data or to query data in one of the microservices.

In the assured protocol online review validation system 200, the blockchain 230 may represent any decentralized blockchain network. All the data on the blockchain 230 is stored as blocks in the network replicated across all the participating nodes. These blockchains typically have miners to execute new transactions. In sample configurations, the assured protocol online review validation system 200 is operated on a pre-existing public blockchain 230 to promote transparency and trust.

In sample configurations, the graph indexer 220 listens to all the blockchain events emitted by the smart contracts (e.g., reward contract 232, staking contract 234, and review state machine contract 236) and indexes them in a queryable data storage. Thus, the graph indexer 220 makes data on the blockchain 230 easy to query and keeps track of all the raw events that are being emitted by the smart contracts. The graph indexer 220 further allows the creation of a specific handler for each event so that special logic, if any, may be handled for an event. For example, a special handler may be created for the review state machine contract 236. When the annotated review 120 is ready for validator selection, post ML annotation and scoring, the validators 130 may be automatically selected and the review state machine contract 236 may be updated with the validators 130 that were selected.

The Provider nodes 240 enable the review explorer 205 to communicate with the smart contracts (e.g., reward contract 232, staking contract 234, and review state machine contract 236) in order for the smart contracts to execute transactions like submitting a review 110 or validating an annotated review 120. Since the blockchain 230 is a decentralized network, every node in the blockchain network maintains a copy of all blocks, including the code and data associated with each smart contract. Since any node of the blockchain 230 can broadcast a request for a transaction to be executed, the review explorer 205 may interact with one of these blockchain nodes in order to interact with the data and code on the blockchain 230. The transaction will then be executed by a miner, and the resulting state change will be propagated to the rest of the network. Sample providers for such functionality include Alchemy, quickNode, etc. Any change to the blockchain data is executed as a transaction. In sample configurations, the blockchain data includes any data that is associated with the state of a review 110. For instance, the current state of the review 110, the validators 130 assigned to a review 110, a current score of a review 110, annotations on a review 110, and the score produced by the ML model all may be stored on the blockchain 230. On the other hand, the actual text and images on a review 110 may be stored of the blockchain 230. All transactions affecting the blockchain data will be facilitated by this Provider node 240.

The reward smart contract 232 calculates the total amount of tokens that will be rewarded to the participants at the end of the review chain. This includes fees that will be awarded to the review protocol, a participation fee given to the participants based on their performance, and a bonus calculated periodically based on the tokens staked. The reward smart contract 232 supports two functions: calculate review fee and calculate bonus. The calculate review fee function is called at the end of a review chain with details including participants, their skill scores, machine learning scores, the final review score, and the amount of tokens allocated per review for a given product. The calculate review fee function transfers the appropriate amount of tokens for individual participants, including the review protocol and the delegator. The calculate review fee function also sets aside a predetermined amount of tokens for a bonus pool that emits the amount of tokens paid to individuals. On the other hand, the calculate bonus function is called periodically to pay bonuses to all the participants who staked tokens against a particular category. The calculate bonus function will take the participants, their current stake, the category and the current bonus pool as the input and transfers the appropriate bonus amounts to the individual participants. The calculate bonus function emits the bonus paid out for a participant.

The staking contract 234 maintains the amount of tokens that have been staked against a review, a category, or a user. The staking contract 234 captures the amount of tokens, the entity that this token is staked against, and the time since it has been staked. These details are stored on the blockchain 230 and used at the end of the review chain to calculate the rewards. The staking contract 234 also calculates and maintains a "staking pool" that is used to reward participants periodically based on their stake. The staking contract 234 also emits the amount being staked, the category, and the participant. Further details about the staking pool are described below with respect to the rewarding mechanism.

The review state machine contract 236 maintains all the state machines associated with a single review chain. The review state machine contract 236 maintains all the data that is stored on the blockchain 230 related to a single review chain. The input to the review state machine contract 236 includes the review's current state and the new event. All the data that the review state machine contract 236 needs to execute the state change is passed on as part of the current state. The output that this smart contract 236 emits is the new state of the review.

Review storage 250 stores all the off-chain text and all the media associated with a review chain. Review storage 250 may store the data as files organized hierarchically as follows:

/reviewId/_data/ contains all the text and media associated with the review itself;

/reviewId/validator_comments/ contains all the comments associated with the validation process;

/reviewId/validator_comments/comment<#> contains an individual comment ordered by timestamp.

The review explorer client 205 directly fetches the data from the review storage 250 as needed.

The APIs and services accessible through the API gateway 215 and that manage the data that is not stored on the blockchain 230 are shown as elements 260, 270, 275, 280, and 285.

The product configurator 260 is responsible for maintaining a database 265 of all the products that are available to be reviewed along with the metadata about the product like category, review questions to ask, minimum number of validators required, kind of plan they are subscribed to, etc. The details about the data model maintained by this service is described in further detail below.

The review annotator 270 is a service (e.g., review annotator 115 in FIG. 1) that is responsible for annotating the review before the review is processed by the validators. The review annotator 270 takes the review text, location, and the user that submitted the review as an input. The review annotator 270 automatically annotates the review with the following signals by way of example:

Readability score: A readability score is provided between 1 to 100, where 1 is least readable and 100 is most readable.
Unnecessary data: Most fake reviews online have unnecessary personal data. This personal data is extracted.
Vocabulary: simple vs complex.
Grammatical usage and mistakes.
Repeated explanation marks.
Overuse of emojis.
Signature verification: Check if the review text is in line with the other reviews created by this reviewer.
Ideal length of the review: The ideal length can be configured based on the product category since longer reviews may be more appropriate for some products, such as books and movies, where a product, such as a type of toothpaste, would ideally have a more concise and shorter review.
Suspected fake review.
Videos or photos are included with the review.
Verification that a purchase has been made.
Whether a competitor's product is referenced in a good light compared to this product.
Did an AI model create the review?
Is the review spam?
Are extracted product features mentioned in the review?
Sentiment—Is the review overly negative or positive (extreme positive/negative)?
Number of reviews from the same userID in the last x hours.
IP Address of the reviewer.
Skill score of the reviewer.

Based on these signals, an initial scoring created by the machine learning (ML) model representative of the validity of the review is calculated. The initial score is passed to the validators along with the annotations as described with respect to FIG. 1.

The assured scoring engine 275 takes the ML score for a review, the validators' score, and the validators' skill scores to compute the final review score. The logic of assured scoring engine 275 is a quantitative formula that takes into account the inputs mentioned above. For example, a user reviews a type of coffee. The review is scored as a 65.25 by the ML model of the review annotator 270. The validators score the review as a 75.50. The configuration for the product owner is that the ML score is 60% and validation score is 40% of the review's assured score calculation. Therefore, the review's assured score is 69.35 (=(65.25)(0.6)+(75.5)(0.4)). The review's assured score can be updated at a later time based on information passed to the review protocol. Whether the review is marked as helpful or unhelpful by other users can increase or decrease the assured score. If the review is later identified as a verified purchase, the score can be improved. If the review is sent through the arbitration process, the result of arbitration could impact the review's assured score. Also, if the review is sent back through validation, the assured score could be replaced.

The user manager 280 maintains all the participants of the review protocol and the associated skill score. The user manager 280 updates the database 265 at the end of every review chain. The database 265 will not contain any personally identifying information. Instead, the database 265 will contain the walletID and skill scores computed for the walletID.

The skill scoring engine 285 is responsible for calculating the skill score of an individual associated with a specific category. Skill scoring happens at the end of a review chain. The output of the skill scoring engine 285 service is stored in the user manager 280 service. The skill scoring engine 285 maintains an unidentified database of all review chains that is processed by the review protocol. The resulting database is used to train a ML model. The trained ML model is responsible for predicting the individual's skill score in a specific category. Some of the features that may be used to calculate individual's skill score may include one or more of the following:

amount of tokens that a user has staked against a given category;
number of validated reviews authored in that category or one of its siblings;
number of successful validations performance in that category or one of its siblings;
completeness of each validation as measured;
99th percentile of the time taken to complete a validation;
completeness of the authored review;
usefulness rating of the reviews that the individual participated in; and
user's confirmed purchases based on a review validated by a validator.

A regression model may be used to generate a score between 0-1 against a given category. A score of 1 will indicate that the user is an expert level in a given category, and a score 0 will indicate that the user has no previous experience in this subject.

Figure 3:
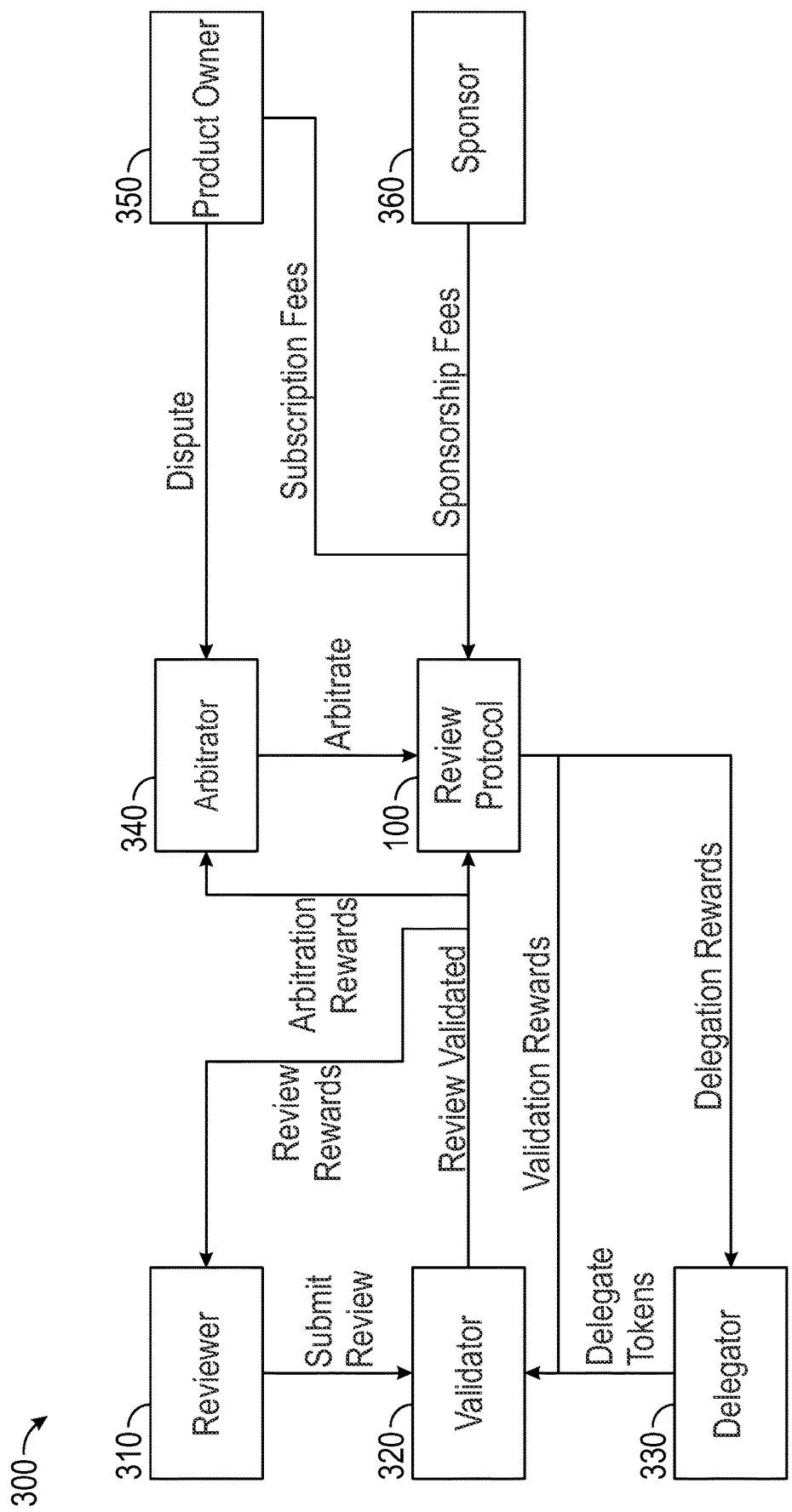
FIG. 3 is a diagram illustrating the relationships of the user roles to the method of FIG. 1 in a sample configuration.

FIG. 3 is a diagram 300 illustrating the relationships of the user roles to the assured protocol online review validation method 100 of FIG. 1 in a sample configuration. As illustrated in FIG. 3, there are several roles that participate in the assured protocol online review validation method 100 of FIG. 1. Each user in the network can assume multiple roles for different review chains. With the exception of the delegator role, no single user can assume multiple roles within a single review chain. For instance, the user who created a review cannot be the validator or delegator for that review. A review chain is defined as workflow and the reward mechanisms associated with a single review against a product or a service. All fees in this review protocol 100 will be collected/paid using the review protocol's utility token.

Reviewers 310 are the users that create and submit a review 110. In order to post a review 110 against a product or a service, reviewers 310 may have to verify that they are qualified to do so. Product owners 350 will be able to setup different mechanisms like a survey to test a reviewer's knowledge, integrations with retailers, QR Code based validations to validate that user's qualifications to post a review, etc. Once qualified, reviewers 310 will be expected to post a review 110 by answering questions specific to a product category. The answers to the specific questions in a survey can be a written text, recorded video, etc. A five star rating and written review may be associated with each question. Reviewers 3310 also have the ability to add additional detail unrelated to the question and attach videos and images.

Validators 320 are responsible for actually validating a review 110. Each validator 320 validates an annotated review 120 annotated via the ML model 115 of FIG. 1. Validations on a given review across multiple dimensions are collected including, for example: quality and usefulness of the overall review, attached media supporting the review, bias, suspected fake, and the like. Validators 320 may stake coins against specific categories in order to receive more reviews in those categories. Delegators 330 can deposit coins on behalf of a validator 320 against specific categories. A validator's skill score determines how many validations a review needs. The review protocol 100 may require a predetermined number of validation points for a review to be considered "validated." The approval of each validator 320 is counted towards the validation points by a factor of the validator's trust score. Thus, each validator's approval adds to the validation score, and when the total validation score is greater than or equal to the predetermined "validated" value, the review will be considered validated.

Delegators 330 are users that desire to stake tokens and earn rewards but may not wish to perform validation services. Delegators 330 can elect to delegate their stake to a validator 320, splitting the validator rewards from the review protocol 100. Delegators 330 can change their delegated stake between different validators 320 as they please, ensuring that validators 320 properly perform their duties or risk loss of delegators 330 and therefore their reward splits. Delegators 330 can delegate their tokens to the validators 320 for specific categories (pods). By contributing towards a validator's stake, delegators 330 earn a portion of the validator's fees and rewards. The fees that the validator 320 will receive for a given review will depend on the validator's own stake towards a given category and the stake contributed by the delegator 330. When delegating tokens to a validator 320, the delegator 330 is able to choose categories (pods) in which the staked tokens will be deposited. This way, delegators 330 can choose to only stake on certain categories (pods) that the validator 320 participates in and not all categories (pods).

Arbitrators 340 are a subset of validators 320 that are assigned to arbitrate contested reviews. A reviewer 310 can re-submit a review for revalidation, with limits to control costs, if the reviewer 310 feels that a review was not scored correctly. A product owner 350 can submit a review for arbitration, essentially disputing the validity of the review or assured score. The reviews going through the arbitration process cannot use any of the validators 320 or reviewers 310 that were part of the previous review chain to make sure the arbitration process is fair. When a review's validation status is flipped because of an arbitration process, the original validator's skill score will be adjusted accordingly. Arbitrators will settle the dispute through a specified arbitration process. As an example, suppose a review was originally validated by five validators 320. Suppose three of those validators 320 considered the review to be useful and not fake and the other two validators 320 considered the review to be fake. Based on this input, the review might have been marked as not fake. If arbitrated and found differently, then the review protocol 100 will reduce the skill score of the three validators 320 who considered the review to be not fake. In this situation, if the review is arbitrated and found to be a fake review, the arbitrators 340 could make a decision to change the review state to invalid.

Product owners 350 are responsible for funding the review process through subscription fees. The product owners 350 are expected to purchase a certain amount of tokens to fund the review process. The product owners 350 are also responsible for setting up the validator decentralized autonomous organization (DAO) 135 and the policies associated with the validator DAO (described below). Product owners 350 can add up the products and assign categories to them. These products and their details can be maintained off the blockchain 230. By default, all these reviews are expected to be public unless the product owner 350 configures them to be private for an additional fee.

Sponsors 360 are typically manufacturers, distributors, or retailers of products, goods, and services that wish to advertise these goods and services through the review protocol 100 by providing sponsorship fees. Product owners 350 also can take the role of a sponsor 360.

Figures 4A, 4B:
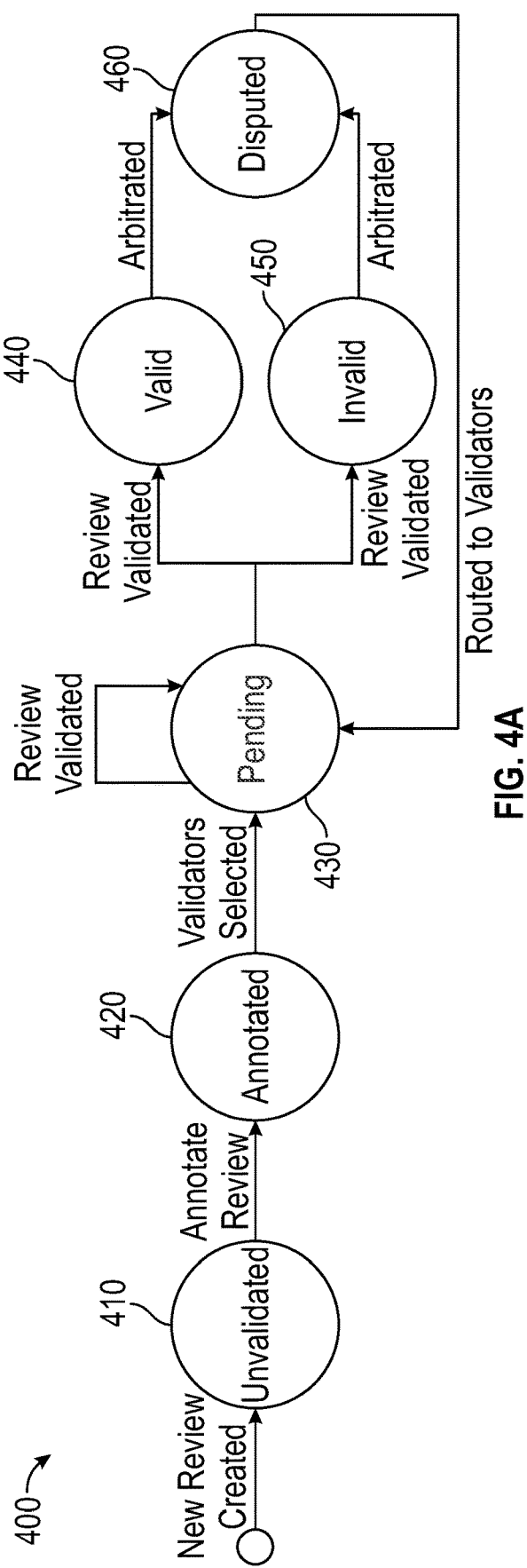
FIG. 4A is a diagram illustrating a state diagram of the assured protocol online review validation method in a sample configuration.
FIG. 4B is a chart illustrating the event states of the assured protocol online review validation method of FIG. 4A in a sample configuration.

FIG. 4A is a diagram illustrating a state diagram 400 of the review protocol 100 in a sample configuration. As illustrated in FIG. 4A, when a new review 110 is created, the review protocol 100 enters the unvalidated state 410. Once the new review 110 has been annotated, the review protocol 100 enters the annotated state 420. Once validators 320 have been selected, the review protocol 100 enters the pending state 430. Once the selected validators 320 have reviewed the new review 110 and determined the new review 110 to be valid, the review protocol 100 enters the valid state 440. Conversely, once the selected validators 320 have reviewed the new review 110 and determined the new review 110 to be invalid, the review protocol 100 enters the invalid state 450. If the new review 110 is disputed, the review protocol 100 enters the disputed state 460 until the new review 110 is moved to the valid state 440 or the invalid state 450 by the arbitrator 340.

FIG. 4B is a chart illustrating the respective event states of the review protocol 100 of FIG. 4A. In a sample configuration a state machine smart contract is provided that contains the logic to implement the transitions shown in FIG. 4B. The state machine smart contract maintains a state machine that uses the "mapping" data structure, which allows for the storage of key-value pairs in the blockchain 230. In this case, the keys represent the different states of the state machine, and the values represent the corresponding actions or conditions that need to be fulfilled in order to transition to the next state. To implement this, the state machine smart contract defines a set of functions that allow for the manipulation of the state machine. For example, there may be a function to initialize the state machine with a starting state and another function to transition to the next state based on certain conditions or actions. The state machine smart contract also may incorporate additional features, such as the ability to store data related to the state machine, or to enforce certain rules or constraints on the transitions between states. Overall, the smart contract that maintains a state machine provides a flexible and secure way to manage and update the state of a given review using the decentralized and tamper-proof nature of the blockchain 230.

Figure 5:
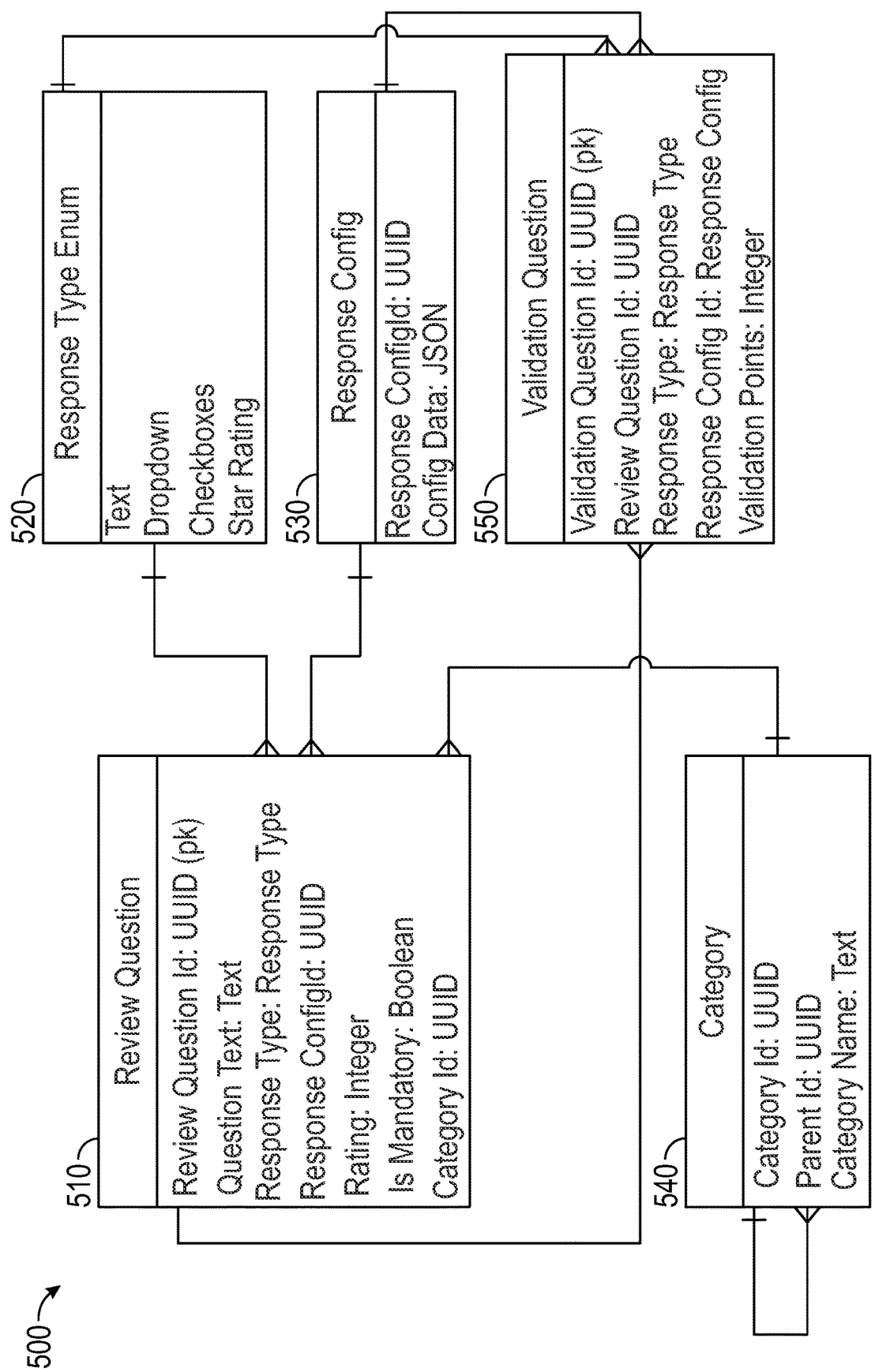
FIG. 5 illustrates a review and validation data structure in a sample configuration.

The review protocol 100 allows review data structures to be defined per category pod. FIG. 5 illustrates a review and validation data structure 500 in a sample configuration. If a review category does not have a review data structure defined, it will inherit one from its parent.

As illustrated in FIG. 5, the review and validation data structure 500 includes a list of questions defined for each review category. Each review question 510 may have the following fields:
Review question ID (UUID);
Question text (e.g.: What did you think about the story line of this book?);
Response type 520 (dropdown, text, checkboxes, etc.);
Response configuration ID (UUID) 530;
Rating;
Is review question mandatory (Boolean); and
Category ID (UUID) 540.

In order to make sure that the reviews 110 can be validated in a fair and transparent way, each review question will have multiple validation questions 550 associated with them. These validation questions 550 will validate the specific review question in a different light. Most validation questions 550 will be modeled as a yes/no Boolean response to encourage more validations. In sample configurations, each validation question 550 may include the following metadata:
Validation question text;
Associated review question;
Response type (star rating, Boolean, dropdown choices); and
Validation points per option in the response (e.g.: [yes: 1; no: 0] [1 star=0.2, 2 star=0.4, 3 star=0.6, 4 star=0.8, 5 star=1.0]).

The goal is to normalize all validations for a given review question to a number (i.e., validation points). Some properties the validation questions should abide by include:
All the validation questions associated with a review question should have same maximum possible score.
All validation questions associated with a single review question are mutually exclusive.
The relationship between a review question and associated validation questions is 1:N. The maximum validation points that can be scored by a validator for each review question cannot be greater than the sum of the points of the validation questions associated with the review question.

The users participating in the review protocol 100 may be rewarded for their participation via appropriate fees and bonuses. Each review 110 that is submitted is allocated some tokens (also referred to as "bounty") to be paid out for fees and bonuses. The bounty amount will be configured and governed by each category pod. Reviewers 310 and validators 320 both earn a fee for participating in the review chain. Each validator 320 gets a validator fee per review as governed by the category pod. There is also a bonus pool that is funded by setting aside some portion for every single review. This bonus pool is split between validators 320 and delegators 330 proportionally based on their stake. Validators 320 are incentivized based on their stake and overall performance. A validator's performance is measured by how many successful validations the validator 320 performs and the confidence level that those validations are accurate. Each reviewer 310 is paid towards the end of every review chain. There is a minimum review fee that all validated reviews get paid, and the reviewers 310 are paid more based on the validation points received for the reviews.

For example, a user reviews a book in the non-fiction memoir pod. The non-fiction memoir pod has a maximum bounty of 2 tokens per user review, up to 3 tokens per review for validation fees, and up to 0.5 tokens for delegator rewards. The ML scores the review 44 out of 100 and three validators score the review 50 out of 100. The three validator skill/trust scores and staking level are equal to each other. The validation deviation score is over the full fee minimum and there are no delegators sharing fee distribution. Therefore, each validator 320 earns 1 token for performing a review validation. The ML score is 70% and the validation score is 30% of the review's assured score, so the review's assured score is 45.8 out of 100 (=(0.7)(44)+(0.3)(50)). Having met the minimum review bounty score threshold, the user would receive 45.8% of the 2 token maximum and earn 0.916 tokens.

All the participants (FIG. 3) interact with this review protocol 100 using a wallet application specifically designed to collect and store tokens earned through protocol participation with each participant maintaining a unique wallet address for their tokens. As participants earn bounties or fees, the tokens are stored within each product category and assigned to the participant's unique wallet address. The tokens are transferred from the product category to the participant's wallet at the end of a predetermined time period.

It will be appreciated that there may be situations where a user does not have a wallet connected with the protocol. That may occur if the user is using an application powered by the assured protocol but not forcing its customers to connect to a wallet. In this case, the assured protocol will accept and process the review 110, will create a user record and distribute rewards, and will send notice to the reviewer 310 to accept the rewards using a wallet.

Figure 6:
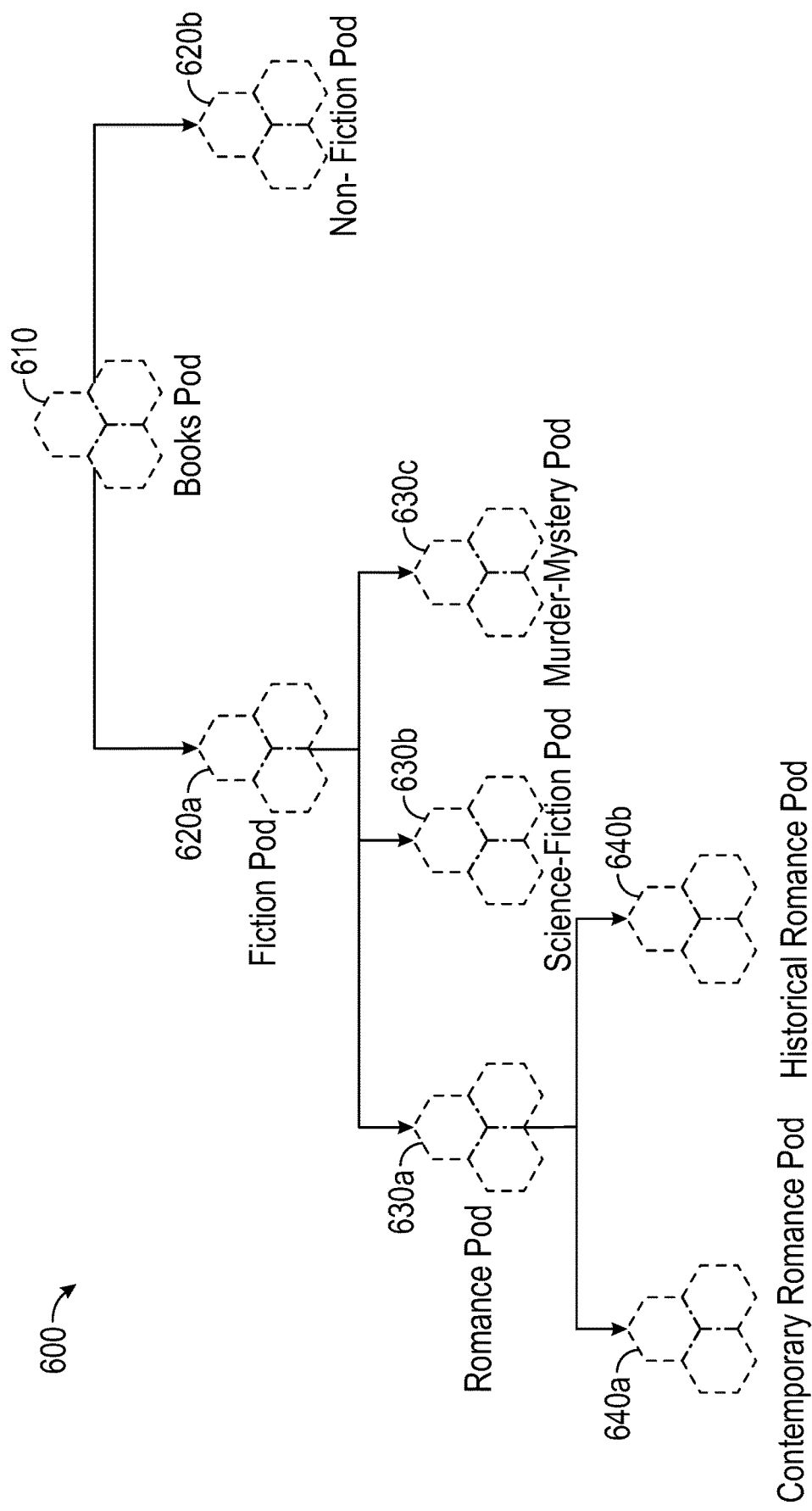
FIG. 6 illustrates a sample representation of a validator decentralized autonomous organization (DAO) data structure for clustering pods in a sample configuration.

FIG. 6 illustrates a sample representation of a validator decentralized autonomous organization (DAO) data structure 600 for clustering pods in a sample configuration. As illustrated in FIG. 6, the validator DAO data structure 600 is composed of clusters of pods that are a hierarchical organization of product or service categories. For example, books can be categorized into multiple category pods or hierarchies 610. A book in book pod 610 may be classified as a fiction pod 620a or a non-fiction pod 620b. The book could then be classified under the fiction pod 620a as a romance fiction pod 630a, a science-fiction pod 630b, a murder-mystery fiction pod 630c, etc. If the book is classified in the romance fiction pod 630a, it could be further classified as a contemporary romance pod 640a, a historical romance pod 640b, etc. Each pod in the validator DAO 600 is thus a cluster of a self-managed group of validators 320 focused on a specific category.

In sample configurations, proof-of-stake is used as a consensus mechanism for users to validate new reviews. Users can stake utility tokens in one of the following ways:
stake tokens for themselves to be a member of a specific pod;
delegate tokens to another user to be a member of a specific pod; or
delegate tokens to another user without any restriction to a pod.

Users will have their own tokens and the delegated tokens at their disposal to stake against a pod. In addition to having the opportunity to validate more reviews or obtain delegation rewards, staking allows protocol participants to earn staking token rewards (bonuses) based on a variable average percentage yield (APY). The staking tokens are distributed to participants who keep their tokens "staked" within the review protocol 100 for a specified period of time no matter if they are staking for themselves or whether they are delegating tokens to another user. For example, a participant stakes 500 tokens across multiple pods within the review protocol 100 as both a validator 320 and a delegator 330. The staking time period is set to 6 months with an APY of 5%. The participant's tokens remain staked in the protocol for the 6 month time period, earning the user a 12.5 token staking reward that is deposited to the user's wallet.

During operation of the review protocol 100, all reviews that need validation are fairly distributed amongst members of the category pod that the review belongs to. For example, the reviews may be distributed in a round robin fashion as follows:

All members of the pod are organized in a queue like fashion in the order based on the amount of stake;

An invitation to validate the annotated review is pushed to the first x number of validators in the queue. If a validator accepts the request to validate the review, the validator will be added to the end of the queue.

All invitations will expire in seconds if it is not accepted before that.

If a validator does not respond to more than n number of invitations, then they will be taken off the list for t hours.

An individual's stake against a category may be given priority over their skill score. The more their skill score is, the better their chances of getting picked by the review protocol 100 to validate. In order for a user to validate a review 110, the review 110 needs to be first pushed by the review protocol 100 into the user's validation queue. The validator 320 can accept or skip validation requests. Requests that are not accepted or rejected within a predetermined number of minutes (x) may expire automatically.

A validators' skill score determines how many validations a review needs. The review protocol 100 may require a predetermined number of validation points for a review 110 to be considered "validated". Each validator's approval will count towards the validation points total by a factor of their skill score. Each validator's approval will add to the validation score, and when the total validation score is greater than or equal to the predetermined validation point total, the review 110 will be considered validated. The number of validators 320 the review protocol 100 chooses depends on the scores of the top validators available in each category and the participation rate.

When a review 110 is forwarded to a validator 320, the review will contain ML based annotations to inform the validators 320 about the characteristics of that review 110. In addition to the ML annotations, the right routing logic will pick the specific validation questions that cover all the review questions. The routing logic will make sure that there is an even distribution of all validation questions amongst all the validators 320. The goal of this distribution is to make sure no two validators 320 will end up receiving the same set of questions.

Figure 7:
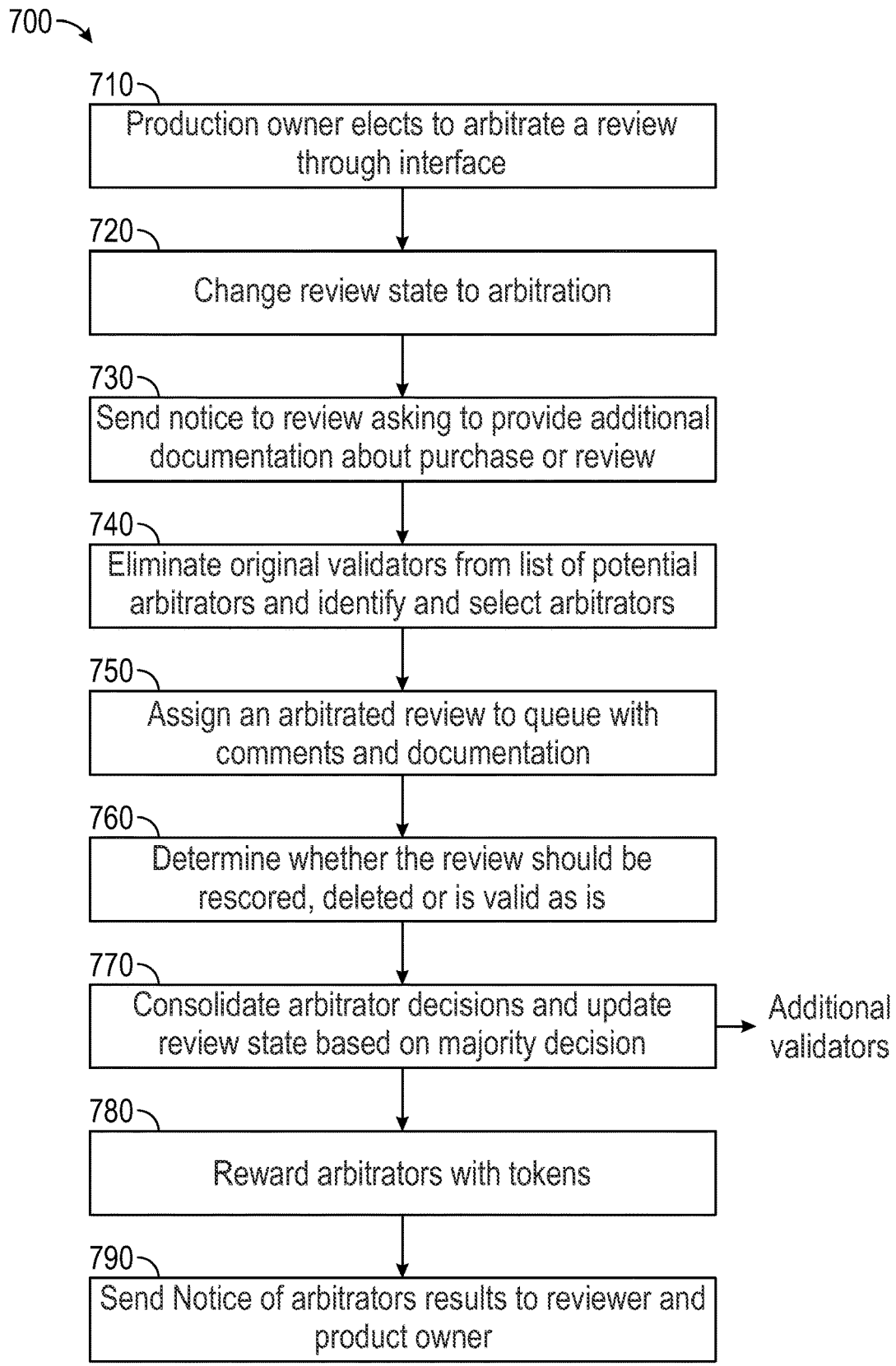
FIG. 7 is a flow chart illustrating the arbitration process in a sample configuration.

When a review 110 is disputed by a product owner 350, arbitrators 340 may be selected in, for example, a round robin fashion. Original validators 320 of the review 110 cannot be selected as an arbitrator 340. As illustrated in FIG. 7, the arbitration process 700 may proceed as follows:

At 710, a product owner 350 elects to arbitrate a review 110 through the protocol interface. For example, a product owner 350 may question the validity of a high scoring negative review of the owner's product.

At 720, the system 200 changes the review state to arbitration.

At 730, the system 200 sends a notice to the reviewer 310 asking the reviewer 310 to provide additional documentation about the purchase or review 110. The reviewer 310 will have a set time to upload and send additional arbitration documentation. If the reviewer 310 does not add additional information in the set time limit, then the arbitration is completed without it.

At 740, the system 200 eliminates original validators 320 from the list of potential arbitrators and identifies and selects arbitrators (e.g., in a round robin fashion).

At 750, the system 200 assigns an arbitrated review to the review protocol queue with comments and documentation.

At 760, arbitrators use the review protocol queue interface to determine whether the review should be rescored, deleted, or is valid as is.

At 770, the system 200 consolidates arbitrator decisions and updates the review state based on the majority decision. If the decision does not have a majority, the system 200 may send to additional validators.

At 780, the system 200 rewards arbitrators with tokens.

Finally, at 790, the system 200 sends notices to the reviewer 310 and the product owner 350 with the arbitration result.

In addition to the state machine smart contract mentioned above, a staking and routing smart contract may be used to handle a majority of the interactions of the review protocol 100. The staking and routing smart contract uses staked tokens as a way to prioritize participants similar to how a decentralized exchange (DEX) or a decentralized finance (DeFi) platform works. Validators 320 may stake a certain amount of tokens against a category in order to receive a higher priority in the validator's queue. The staking and routing smart contract takes into account the amount staked by the validator 320 in addition to other factors like the validator's skill/trust score in order to prioritize. This approach helps to ensure that the review protocol 100 remains fair and equitable, with users who have demonstrated their support for the review protocol 100 by staking their tokens being rewarded with priority access to its services.

Those skilled in the art will appreciate that the methods described herein for validating online product reviews may be used to validate other types of data provided online with respect to a product or service. The data may not be technically defined as a "product review" but may nevertheless provide information relevant to the online purchase of a product or service. Such data is intended to be included within the term "review" of a product as used herein.

Sample Computer Platform for Assured Protocol Online Review Validation System

Figure 8:
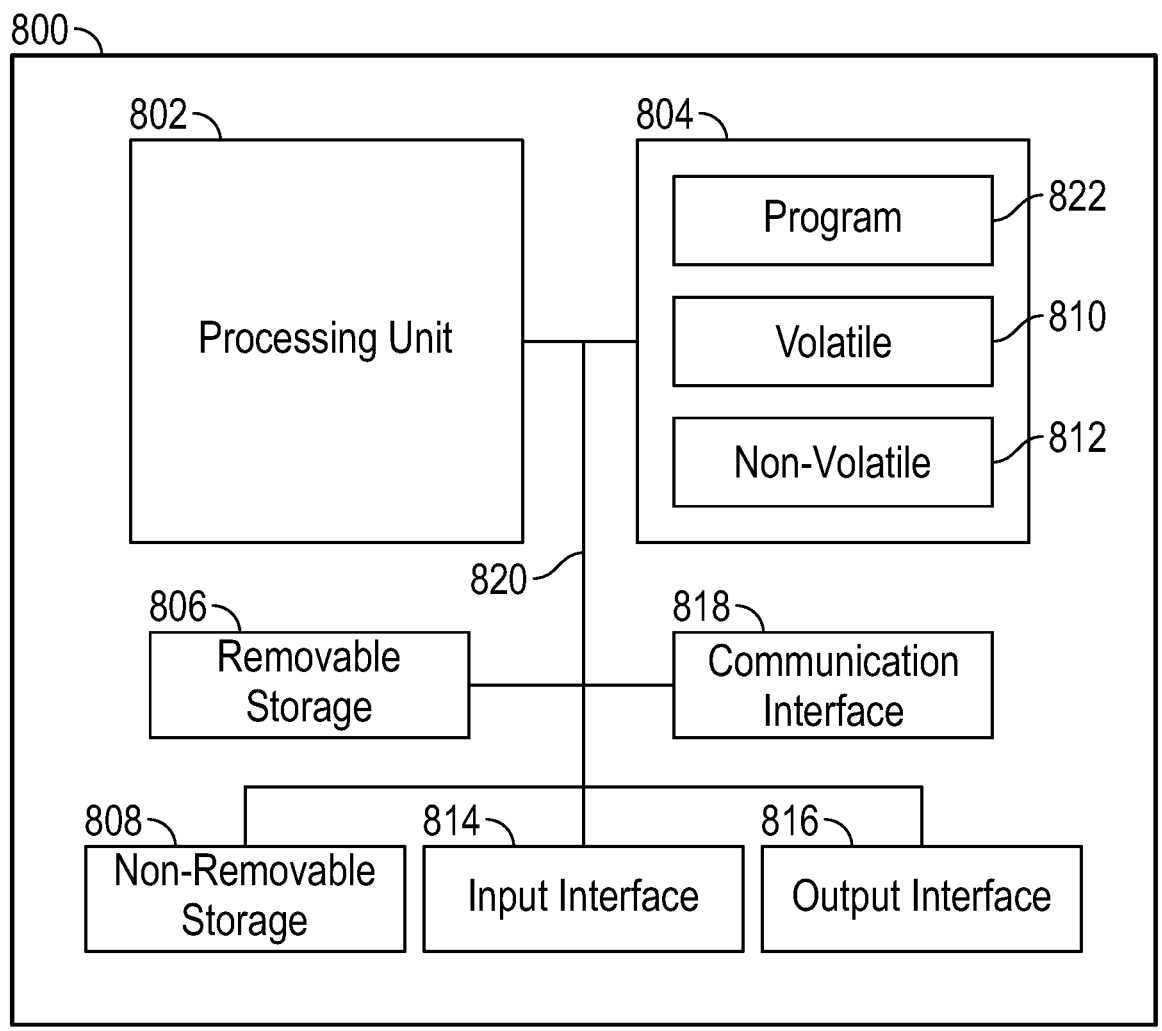
FIG. 8 is a block diagram illustrating circuitry for performing methods and implementing processing features according to the sample configurations.

FIG. 8 illustrates one example of a computing device in the form of a computer 800 that may include a processing unit 802, memory 804, removable storage 806, and non-removable storage 808 for implementing the processing features described above in a user client device and/or a server. Although the example computing device is illustrated and described as computer 800, the computing device may be in different forms in different configurations. For example, the computing device may comprise the user's computing device as well as the backend infrastructure. The computing device may be a smartphone, a tablet, smartwatch, or other computing device including the same or similar elements as illustrated and described with regard to FIG. 8. Devices, such as smartphones, tablets, and smartwatches, are generally collectively referred to as mobile devices or user equipment. Further, although the various data storage elements are illustrated as part of the computer 800, the storage may also or alternatively include cloud-based storage accessible via a network, such as the Internet or server-based storage.

Memory 804 may include volatile memory 810 and non-volatile memory 812.

Computer 800 also may include, or have access to a computing environment that includes, a variety of computer-readable media, such as volatile memory 810 and non-volatile memory 812, removable storage 806 and non-removable storage 808. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 800 may further include or have access to a computing environment that includes input interface 814, output interface 816, and a communication interface 818. Output interface 816 may include a display device, such as a touchscreen, that also may serve as an input device. The input interface 814 may include one or more of a touchscreen, touchpad, mouse, keyboard, camera, one or more device-specific buttons, one or more sensors integrated within or coupled via wired or wireless data connections to the computer 800, and other input devices.

The computer 800 may operate in a networked environment using communication interface 818 to connect to one or more remote computers. The remote computer may include a personal computer (PC), server, router, network PC, a peer device or other common network switch, or the like. The communication connection accessed via communication interface 818 may include a Local Area Network (LAN), a Wide Area Network (WAN), cellular, Wi-Fi, Bluetooth, Zigbee, or other networks. According to one configuration, the various components of computer 800 are connected with a system bus 820.

Computer-readable instructions stored on a computer-readable medium are executable by the processing unit 802 of the computer 800, such as a program 822. The program 822 in some configurations comprises software that, when executed by the processing unit 802, performs operations according to any of the configurations and models included herein. A hard drive, CD-ROM, and RAM are some examples of articles including a non-transitory computer-readable medium, such as a storage device. The terms computer-readable medium and storage device do not include carrier waves to the extent carrier waves are deemed too transitory. Storage can also include networked storage, such as a storage area network (SAN). Computer program 822 may be used to cause processing unit 802 to perform one or more methods or functions described herein.

It should be further understood that software including one or more computer-executable instructions that facilitate processing and operations as described above with reference to any one or all of steps of the disclosure may be provided in user portable electronic client devices to implement the features described herein. Alternatively, the software may be obtained and loaded into a server for implementing the features described herein through interaction with a user's client device. The software may be stored on a server for distribution over the Internet, for example.

Also, it will be understood by one skilled in the art that this disclosure is not limited in its application to the details of construction and the arrangement of components set forth in the above description or illustrated in the drawings. The configurations herein are capable of other configurations, and capable of being practiced or carried out in various ways. Also, it will be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

The components of the illustrative devices, systems and methods employed in accordance with the illustrated configurations may be implemented, at least in part, in digital electronic circuitry, analog electronic circuitry, or in computer hardware, firmware, software, or in combinations of them. These components also may be implemented, for example, as a computer program product such as a computer program, program code or computer instructions tangibly embodied in an information carrier, or in a machine-readable storage device, for execution by, or to control the operation of, data processing apparatus such as a programmable processor, a computer, or multiple computers.

A computer program may be written in any form of programming language, including compiled or interpreted languages, and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. Also, functional programs, codes, and code segments for accomplishing the systems and methods described herein may be easily construed as within the scope of the disclosure by programmers skilled in the art to which the present disclosure pertains. Method steps associated with the illustrative configurations may be performed by one or more programmable processors executing a computer program, code or instructions to perform functions (e.g., by operating on input data and generating an output). Method steps may also be performed by, and apparatus may be implemented as, special purpose logic circuitry, e.g., an FPGA (field programmable gate array) or an ASIC, for example.

The various illustrative logical blocks, modules, and circuits described in connection with the configurations disclosed herein may be implemented or performed with a general purpose processor, a digital signal processor (DSP), an ASIC, a FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. As used herein, a "plurality" comprises two or more.

Processors suitable for the execution of a computer program include, by way of example, both general and special purpose microprocessors, and any one or more processors of any kind of digital computer. Generally, a processor will receive instructions and data from a read-only memory or a random-access memory or both. The elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example, semiconductor memory devices, e.g., electrically programmable read-only memory or ROM (EPROM), electrically erasable programmable ROM (EEPROM), flash memory devices, and data storage disks (e.g., magnetic disks, internal hard disks, or removable disks, magneto-optical disks, compact disc ROM (CD-ROM), or digital versatile disc ROM (DVD-ROM). The processor and the memory may be supplemented by, or incorporated in, special purpose logic circuitry.

Those of skill in the art understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those skilled in the art may further appreciate that the various illustrative logical blocks, modules, circuits, and algorithm steps described in connection with the configurations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. A software module may reside in random access memory (RAM), flash memory, ROM, EPROM, EEPROM, registers, hard disk, a removable disk, a CD-ROM, or any other form of storage medium known in the art. A sample storage medium is coupled to the processor such the processor may read information from, and write information to, the storage medium. In the alternative, the storage medium may be integral to the processor. In other words, the processor and the storage medium may reside in an integrated circuit or be implemented as discrete components.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., EEPROM), and any suitable combination thereof. The term "machine-readable medium" should be taken to include a single medium or multiple media (e.g., a centralized or distributed database, or associated caches and servers) able to store processor instructions. The term "machine-readable medium" shall also be taken to include any medium, or combination of multiple media, which is capable of storing instructions for execution by one or more processors, such that the instructions, when executed by one or more processors cause the one or more processors to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" as used herein excludes signals per se.

What is claimed:

1. A method of assuring the validity of online product reviews of a product for online purchase, comprising:

executing, by at least one smart contract processed by at least one processing device, transactions on a blockchain implemented on a node, the transactions including a transaction that stores data relating to changes to online product review data stored on the blockchain, a transaction that stores an address of a crypto-wallet or application of a product reviewer, and a transaction created to record a product review submitted by the product reviewer, the at least one smart contract further specifying a number of tokens to be rewarded to the product reviewer and human validators for providing a valid product review, the at least one smart contract further including a state machine smart contract that stores key-value pairs to the blockchain where the keys represent different states of a state machine and the values represent corresponding actions or conditions that need to be fulfilled in order to transition to a next state of the state machine whereby the state machine manages a state of a product review on the blockchain;

annotating, using a machine learning (ML) annotator implemented by the at least one processing device, the product review from the product reviewer to generate an ML annotated review and providing a first score representative of a validity of the product review;

providing, by a workflow application implemented by the at least one processing device, the ML annotated review to a plurality of human validators for validation, wherein the plurality of human validators have staked at least one token for the ML annotated review;

enabling the plurality of human validators to use the workflow application to access ML annotated reviews and data associated with the ML annotated reviews for which each human validator has staked at least one token for at least one of the ML annotated reviews, to submit product reviews for a product, to fetch data and execute transactions on the blockchain, and to provide a second score representative of the validity of the ML annotated product review;

once a predetermined number of second scores have been collected from the human validators, categorizing, by an assured scoring engine implemented by the at least one processing device, each product review as valid or invalid based on a final score that is a predetermined function of the first score and the second scores;

rewarding, by the at least one smart contract implemented by the at least one processing device, tokens to the crypto-wallet or application of the product reviewer and at least one of the human validators for providing the product review based on the number of tokens to be rewarded for the valid product review by the at least one smart contract, the number of tokens staked against the product review in a proof-of-stake consensus model by the at least one of the human validators, and an accuracy of the product review, wherein the at least one smart contract receives tokens from at least one of the product review or human validators to fund the online product reviews;

providing, by the workflow application implemented by the at least one processing device, to at least one of the product reviewer or an owner of a product to which the product review is directed an indication of whether the product review is valid or invalid; and storing, by the at least one smart contract, data relating to a status of the product review to the blockchain, wherein the status of the product review includes at least one of a current state of an online product review, validators assigned to the online product review, a current score of the online product review, annotations on the online product review, or a score produced by the ML annotator.

2. The method of claim 1, wherein the at least one smart contract executing transactions on the blockchain comprises the at least one processing device executing instructions of the at least one smart contract to perform at least one of the functions of:
- assuring that only qualified product reviewers review the product to provide a product review;
- allowing a product reviewer to get paid based on a quality of the product review provided by the product reviewer;
- using a ML model to match human validators to the product based on knowledge of the human validators in a product category to which the product belongs;
- keeping track of skill sets of product reviewers and human validators in each product category;
- keeping track of micro-categories under each product category;
- using machine learning to identify at least one of incentivized product reviews or fake product reviews and providing the at least one of incentivized product reviews or fake product reviews to the plurality of human validators; or
- normalizing the product review based on a skill profile of the product reviewer.

3. The method of claim 1, wherein annotating the product review from the product reviewer to generate the ML annotated review comprises automatically annotating the product review with at least one of the following:
- a readability score;
- simple or complex vocabulary;
- grammatical usage and mistakes;
- use of repeated explanation marks;
- overuse of emojis;
- an indication of whether text of the product review is in line with other product reviews created by the product reviewer;
- an ideal length of the product review;
- whether the product review is suspected to be fake;
- whether videos or photos are included with the product review;
- verification that a purchase has been made;
- whether a competitor's product is referenced favorably compared to the product in the product review;
- whether an artificial intelligence model created the product review;
- whether the product review is spam;
- whether extracted product features are mentioned in the product review;
- whether the product review is overly negative or positive;
- a number of product reviews from a same userID in the last predetermined number of hours;
- an IP Address of the product reviewer; or
- a skill score of the product reviewer.

4. The method of claim 1, wherein providing the ML annotated review to the plurality of human validators for validation comprises distributing the ML annotated review to human validators who are members of a product category to which the product review belongs in a round robin fashion.

5. The method of claim 4, wherein distributing the ML annotated review to human validators in the round robin fashion comprises distributing the ML annotated review to all human validators who are members of the product category in a queue-like fashion in an order based on an amount of tokens at stake by each human validator or to a first x number of validators in a queue, wherein when a human validator does not respond to more than n number of invitations, the human validator is removed from the queue for a predetermined period of time.

6. The method of claim 5, wherein the product categories are maintained as a validator decentralized autonomous organization (DAO) data structure that clusters the product categories hierarchically.

7. The method of claim 1, wherein the predetermined function of the first score and the second scores is provided by an owner of the product to which the product review is directed to specify an extent to which the product review is to be based on ML validation versus human validation.

8. The method of claim 1, wherein the predetermined number of second scores collected from the human validators is a function of skill scores of the human validators that provide the second scores.

9. The method of claim 8, further comprising updating a skill score of at least one of the human validators based on a comparison of the at least one human validator's second score to the final score.

10. The method of claim 9, further comprising calculating the skill score of the at least one of the human validators based on at least one of:
- an amount of tokens that the at least one of the human validators has staked against a given product category;
- a number of validated reviews authored in the given product category or a related product category by the at least one of the human validators;
- a number of successful validations performed in the given product category or the related product category by the at least one of the human validators;
- completeness of each validation performed by the at least one of the human validators;
- a percentile of time taken by the at least one of the human validators to complete a validation;
- a completeness of the product review;
- a usefulness rating of the product reviews participated in by the at least one of the human validators; or
- confirmed purchases based on a product review validated by the at least one of the human validators.

11. The method of claim 10, further comprising generating, using a regression model implemented by the at least one processing device, a skill score between 0-1 against a given product category indicating the skill score of the at least one of the human validators, wherein a skill score of 1 indicates that the at least one of the human validators is at an expert level in the given product category, and a skill score of 0 indicates that the at least one of the human validators has no previous experience in the given product category.

12. The method of claim 1, wherein rewarding tokens to the product reviewer and at least one of the human validators for providing the product review comprises enabling the at least one of the human validators to stake tokens for themselves to be a member of a specific product category, to delegate tokens to another human validator to be a member of the specific product category, or to delegate tokens to another human validator without any restriction to a product category.

13. The method of claim 1, wherein rewarding tokens comprises creating, using a staking smart contract of the at least one smart contract, a staking pool for the product review and rewarding tokens to the product reviewer and the at least one of the human validators from the staking pool based on stakes of the product reviewer and the at least one of the human validators in the staking pool.

14. The method of claim 13, further comprising enabling a delegator to stake tokens to a human validator in the staking pool for a specific product category and to split any tokens rewarded to the human validator as a result of validation services performed by the human validator, wherein the tokens are taken from the staking pool and split proportionally amongst the human validator and the delegator based on respective stakes in the staking pool.

15. The method of claim 1, further comprising the at least one smart contract setting up a validator decentralized autonomous organization (DAO) and policies associated with the validator DAO establishing product categories.

16. The method of claim 1, further comprising providing validation questions to the plurality of human validators, wherein all validation questions associated with a review question have a maximum possible score, all validation questions associated with a single review question are mutually exclusive, a relationship between a review question and associated validation questions is 1:N, and maximum validation points that can be scored by a human validator for each review question is less than a sum of points of the validation questions associated with the review question.

17. The method of claim 1, further comprising arbitrating a challenge to the product review by:
  sending a notice to the product reviewer asking the product reviewer to provide additional documentation about a purchase or the product review;
  assigning the product review to arbitrators excluding human validators of the product review;
  assigning an arbitrated product review to a product review protocol queue with comments and documentation;
  receiving input from the arbitrators indicating whether the product review should be rescored, deleted, or is valid as is;
  consolidating arbitrator decisions and updating a categorization of the product review as valid or invalid based on a majority decision of the arbitrator decisions;
  rewarding the arbitrators with tokens; and
  sending at least one notice with an arbitration result.

18. A system for assuring the validity of online product reviews of a product for online purchase, comprising:
  a blockchain implemented on at least one node;
  at least one processing device executing instructions to implement at least one smart contract that executes transactions on the blockchain, the transactions including a transaction that stores data relating to online product reviews, a transaction that stores an address of a crypto-wallet or application of a product reviewer, and a transaction created to record a product review submitted by the product reviewer, the at least one smart contract further specifying a number of tokens to be rewarded to the product reviewer and human validators for providing a valid product review, the at least one smart contract further including a state machine smart contract that stores key-value pairs to the blockchain where the keys represent different states of a state machine and the values represent corresponding actions or conditions that need to be fulfilled in order to transition to a next state of the state machine whereby the state machine manages a state of a product review on the blockchain;
  the at least one processing device executing instructions to implement a machine learning (ML) annotator that annotates the product review from the product reviewer to generate an ML annotated review and provides a first score representative of a validity of the product review;
  the at least one processing device executing instructions to implement a workflow application that enables users to access ML annotated reviews and data associated with the ML annotated reviews for which each human validator has staked at least one token for at least one of the ML annotated reviews, to submit product reviews for a product, and to fetch data and execute transactions on the blockchain, wherein the workflow application provides the ML annotated review to a plurality of human validators for validation, and wherein the plurality of human validators each provide a second score representative of the validity of the ML annotated product review; and
  the at least one processing device executing instructions to implement an assured scoring engine that, once a predetermined number of second scores have been collected from the human validators, categorizes each product review as valid or invalid based on a final score that is a predetermined function of the first score and the second scores,
  wherein the at least one smart contract specifies a number of tokens to be rewarded to a product reviewer and human validators for providing a valid product review and rewards tokens to the crypto-wallet or application of the product reviewer and at least one of the human validators for providing the product review based on the number of tokens to be rewarded for the valid product review, the number of tokens staked against the product review in a proof-of-stake consensus model by the at least one of the human validators, and an accuracy of the product review, wherein the at least one smart contract receives tokens from at least one of the product review or human validators to fund the online product reviews,
  wherein the workflow application provides to at least one of the product reviewer or an owner of a product to which the product review is directed an indication of whether the product review is valid or invalid, and
  wherein the at least one smart contract stores data relating to a status of the product review to the blockchain, wherein the status of the product review includes at least one of a current state of an online product review, human validators assigned to the online product review, a current score of the online product review, annotations on the online product review, or a score produced by the ML annotator.

19. The system of claim 18, wherein the at least one smart contract performs at least one of the functions of:
  assuring that only qualified product reviewers review the product to provide a product review;
  allowing a product reviewer to get paid based on a quality of the product review provided by the product reviewer;
  using a ML model to match human validators to the product based on knowledge of the human validators in a product category to which the product belongs;

keeping track of skill sets of product reviewers and human validators in each product category;

keeping track of micro-categories under each product category;

using machine learning to identify at least one of incentivized product reviews or fake product reviews and providing the at least one of incentivized product reviews or fake product reviews to the plurality of human validators; or normalizing the product review based on a skill profile of the product reviewer.

20. The system of claim 18, wherein the ML annotator automatically annotates the product review with at least one of the following:

a readability score;

simple or complex vocabulary;

grammatical usage and mistakes;

use of repeated explanation marks;

overuse of emojis;

an indication of whether text of the product review is in line with other product reviews created by the product reviewer;

an ideal length of the product review;

whether the product review is suspected to be fake;

whether videos or photos are included with the product review;

verification that a purchase has been made;

whether a competitor's product is referenced favorably compared to the product in the product review;

whether an artificial intelligence model created the product review;

whether the product review is spam;

whether extracted product features are mentioned in the product review;

whether the product review is overly negative or positive;

a number of product reviews from a same userID in the last predetermined number of hours an IP Address of the product reviewer; or a skill score of the product reviewer.

21. The system of claim 18, wherein the workflow application distributes the ML annotated review to human validators who are members of a product category to which the product review belongs in a round robin fashion.

22. The system of claim 21, wherein the workflow application distributes the ML annotated review to all human validators who are members of the product category in a queue-like fashion in an order based on an amount of tokens at stake by each human validator or to a first x number of validators in a queue, wherein when a human validator does not respond to more than n number of invitations, the human validator is removed from the queue for a predetermined period of time.

23. The system of claim 22, further comprising a validator decentralized autonomous organization (DAO) data structure that clusters the product categories hierarchically.

24. The system of claim 23, wherein the at least one smart contract sets up the validator decentralized autonomous organization (DAO) data structure and policies associated with the validator DAO establishing the product categories.

25. The system of claim 18, wherein the predetermined function of the first score and the second scores is provided by an owner of the product to which the product review is directed to specify an extent to which the product review is to be based on ML validation versus human validation.

26. The system of claim 18, wherein the predetermined number of second scores collected from the human validators is a function of skill scores of the human validators that provide the second scores.

27. The system of claim 26, further comprising a skill scoring engine that updates a skill score of at least one of the human validators based on a comparison of the at least one human validator's second score to the final score.

28. The system of claim 27, wherein the skill scoring engine calculates the skill score of the at least one of the human validators based on at least one of:

an amount of tokens that the at least one of the human validators has staked against a given product category;

a number of validated reviews authored in the given product category or a related product category by the at least one of the human validators;

a number of successful validations performed in the given product category or the related product category by the at least one of the human validators;

completeness of each validation performed by the at least one of the human validators;

a percentile of time taken by the at least one of the human validators to complete a validation;

a completeness of the product review;

a usefulness rating of the product reviews participated in by the at least one of the human validators; or confirmed purchases based on a product review validated by the at least one of the human validators.

29. The system of claim 28, further comprising a regression model that generates a skill score between 0-1 against a given product category indicating the skill score of the at least one of the human validators, wherein a skill score of 1 indicates that the at least one of the human validators is at an expert level in the given product category, and a skill score of 0 indicates that the at least one of the human validators has no previous experience in the given product category.

30. The system of claim 18, wherein the at least one smart contract includes a reward smart contract that rewards tokens to the product reviewer and at least one of the human validators for providing the product review by enabling the at least one of the human validators to stake tokens for themselves to be a member of a specific product category, by delegating tokens to another human validator to be a member of the specific product category, or by delegating tokens to another human validator without any restriction to a product category.

31. The system of claim 18, wherein the at least one smart contract includes a staking smart contract that creates a staking pool for the product review and rewards tokens to the product reviewer and the at least one of the human validators from the staking pool based on stakes of the product reviewer and the at least one of the human validators in the staking pool.

32. The system of claim 31, wherein the staking smart contract enables a delegator to stake tokens to a human validator in the staking pool for a specific product category and to split any tokens rewarded to the human validator as a result of validation services performed by the human validator, wherein the tokens are taken from the staking pool and split proportionally amongst the human validator and the delegator based on respective stakes in the staking pool.

33. The system of claim 32, wherein the staking smart contract uses a validator's staked tokens and the validator's skill score to prioritize the validator in a specific review category for receipt of product reviews for validation.

34. The system of claim 18, wherein the at least one smart contract includes a review state machine contract that maintains all state machines associated with a product review and maintains all data stored on the blockchain relating to the product review.

35. The system of claim 18, further comprising a product configurator that maintains a database of all products that are available for review along with metadata about the product, the metadata including at least one of a product category of the product, review questions to ask, or a minimum number of human validators required.

36. A tangible computer readable medium comprising instructions that when executed by at least one processor causes the at least one processor to perform operations to implement a method of assuring the validity of online product reviews of a product for online purchase, the operations comprising:

executing at least one smart contract transactions on a blockchain implemented on a node, the transactions including a transaction that stores data relating to online product reviews, a transaction that stores an address of a crypto-wallet or application of a product reviewer, and a transaction created to record a product review submitted by the product reviewer, the at least one smart contract further specifying a number of tokens to be rewarded to the product reviewer and human validators for providing a valid product review, the at least one smart contract further including a state machine smart contract that stores key-value pairs to the blockchain where the keys represent different states of a state machine and the values represent corresponding actions or conditions that need to be fulfilled in order to transition to a next state of the state machine whereby the state machine manages a state of a product review on the blockchain;

annotating the product review from the product reviewer to generate a machine learning (ML) annotated review and providing a first score representative of a validity of the product review;

providing the ML annotated review to a plurality of human validators for validation, wherein the plurality of human validators have staked at least one token for the ML annotated review;

enabling the plurality of human validators to access ML annotated reviews and data associated with the ML annotated reviews for which each human validator has staked at least one token for at least one of the ML annotated reviews, to submit product reviews for a product, to fetch data and execute transactions on the blockchain, and to provide a second score representative of the validity of the ML annotated product review;

once a predetermined number of second scores have been collected from the human validators, categorizing each product review as valid or invalid based on a final score that is a predetermined function of the first score and the second scores;

rewarding tokens to the crypto-wallet or application of the product reviewer and at least one of the human validators for providing the product review based on the number of tokens to be rewarded for the valid product review by the at least one smart contract, number of tokens staked against the product review in a proof-of-stake consensus model by the at least one of the human validators, and an accuracy of the product review, wherein the at least one smart contract receives tokens from at least one of the product review or human validators to fund the online product reviews;

providing to at least one of the product reviewer or an owner of a product to which the product review is directed an indication of whether the product review is valid or invalid; and storing, by the at least one smart contract, data relating to a status of the product review to the blockchain, wherein the status of the product review includes at least one of a current state of an online product review, human validators assigned to the online product review, a current score of the online product review, annotations on the online product review, or a score produced by the ML annotated review.

\* \* \* \* \*